United States Patent [19]

Bittner

[11] 4,431,102
[45] Feb. 14, 1984

[54] MULTI-STATION PRODUCTION CONVEYOR

[75] Inventor: Charles Bittner, Haddonfield, N.J.

[73] Assignee: Precision Automation Co., Inc., Cherry Hill, N.J.

[21] Appl. No.: 297,223

[22] Filed: Aug. 28, 1981

[51] Int. Cl.³ .............................................. B65G 21/20
[52] U.S. Cl. ..................................... 198/345; 198/648
[58] Field of Search ............... 198/345, 472, 648, 793, 198/802

[56] References Cited

U.S. PATENT DOCUMENTS 3,645,375  2/1972  Gelzer .................................. 198/648
3,785,475  1/1974  Maynard ............................. 198/472
3,934,701  1/1976  Mooney et al. ..................... 198/472
4,311,229  5/1982  Kamm ................................. 198/345

Primary Examiner—Joseph L. Valenza
Assistant Examiner—Jonathan D. Holmes
Attorney, Agent, or Firm—Robert K. Youtie

[57] ABSTRACT

A multiple station conveyor for production lines and the like including an elongate drive element movable under power along a longitudinal path, a track extending along the path of the drive element, a carrier movable along the track and having an extension for driven engagement with the drive element to move the carrier, and declutching means for disengaging the carrier extension from the drive element.

2 Claims, 5 Drawing Figures

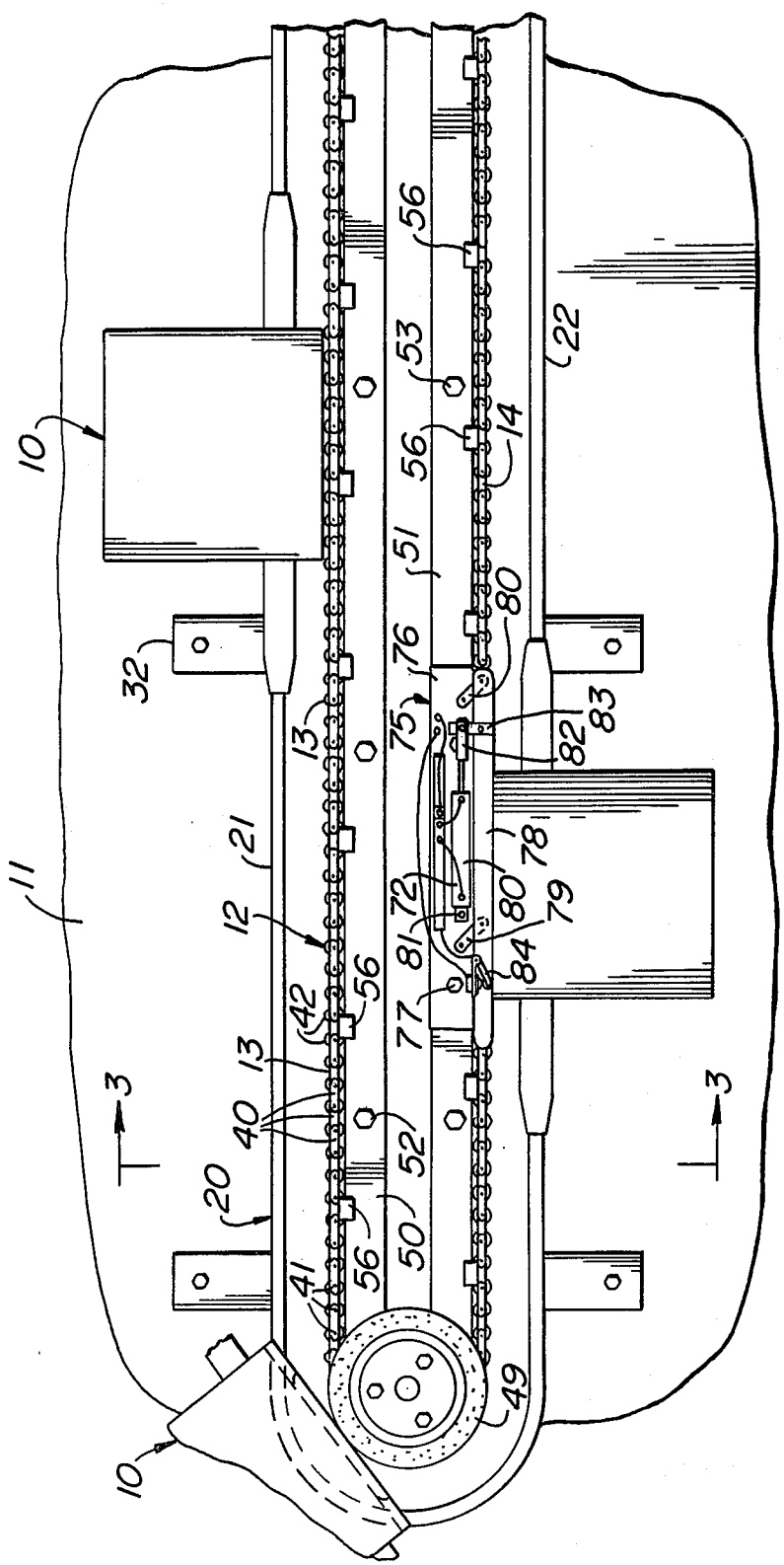

MULTI-STATION PRODUCTION CONVEYOR

BACKGROUND OF THE INVENTION

As is well known to those versed in the art, assembly production lines have often required the movement of assembly carriers or worktables along a predetermined path making stops at predetermined work stations. Heretofore, such assembly lines have been relatively complex in construction, extremely difficult to modify for production changes, and expensive to set up and maintain.

SUMMARY OF THE INVENTION

Accordingly, it is an important object of the present inventionn to provide a multiple station production line conveyor which is extremely simple to construct, durable and entirely reliable throughout a long useful life, highly versatile in its arrangement for accomodation to a wide variety of production line requirements, which is relatively inexpensive to erect and service, and otherwise overcomes the above mentioned difficulties in the prior art.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is a partial top plan view similar to FIG. 1 showing a production conveyor of the present invention on an enlarged scale.

DESCRIPTION OF THE PREFERRED EMBODIMENT

Figure 1:
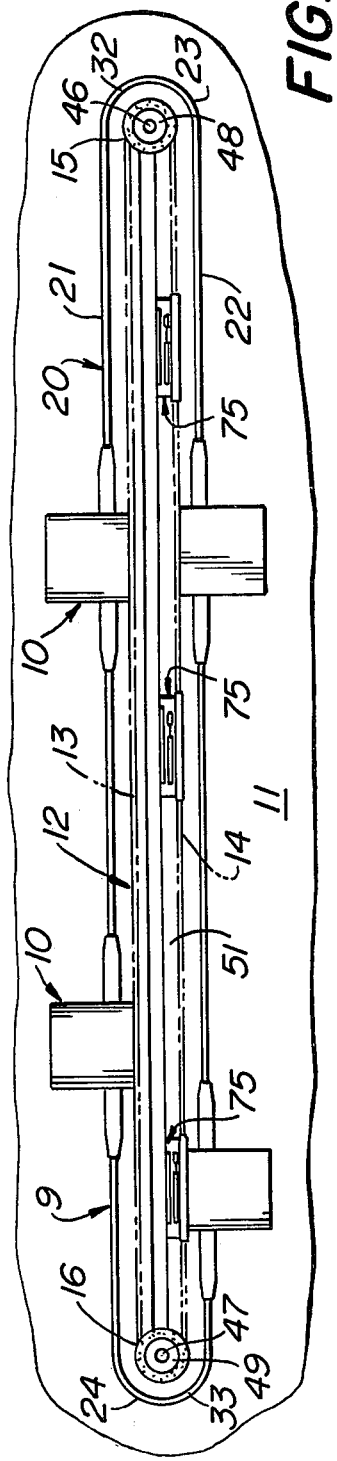
FIG. 1 is a top plan view showing a production conveyor of the present invention on a reduced scale.

Referring now more particularly to the drawings, and specifically to FIG. 1 thereof, the conveyor of the present invention is there generally designated 9, being set up on a supporting surface or floor 11. The conveyor 9 may include an endless drive element or chain 12, which may be of ovaloid configuration in plan view having a pair of generally parallel runs 13 and 14, connected together at opposite ends by turnarounds 15 and 16. Extending conformably along and outward of the endless, ovaloid drive element 12 may be an endless, ovaloid track 20. Similar to the drive element 12, track 20 may include a pair of longitudinally extending, generally parallel track runs 21 and 22, having their adjacent ends connected together by generally U-shaped track sections or turnarounds 23 and 24. As may be seen in FIG. 1, the ovaloid track 20 extends conformably and spacedly about the drive element 12.

The track 20 may be formed of rigid upstanding plate material, the track runs 21 and 22 having generally parallel, substantially coplanar upper edges 30 and 31, while the track end sections 23 & 24 have generally horizontal, arcuate upper edges or surfaces 32 and 33, defining flush continuations of the upper track edges or surfaces 30 and 31. The track plates 21 and 22 may be suitably fixed in their parallel, horizontally elongate, vertically disposed relation by affixation to suitable support means, such as pedestal 36 which may carry a horizontal plate 33 having brackets or angles 34 and 35 respectively fastened to and fixedly supporting track plates 21 and 22. The arcuate track sections 23 and 24 may be suitably secured to the run sections 21 and 22, as desired.

The drive element 12 may be constituted of an endless roller chain including a plurality of articulated links 40 pivotally connected together by pins 41, which pins respectively journal frictional rollers 42. The roller chain 12 may have its opposite end sections 15 and 16 trained about respective, generally horizontal sprocket wheels 45, see FIG. 3, respectively carried by upstanding end shafts or axles 46 and 47, one of which may be driven by a suitable drive or motive means, such as an electric motor (not shown).

Also carried by each upstanding shaft 46 and 47, generally at the upper end thereof and for rotation therewith, is a generally horizontal friction wheel, as at 48 and 49. The friction wheels 48 and 49 may be provided with a rubber peripheral covering or other suitable frictional material, for a purpose appearing presently.

Figure 3:
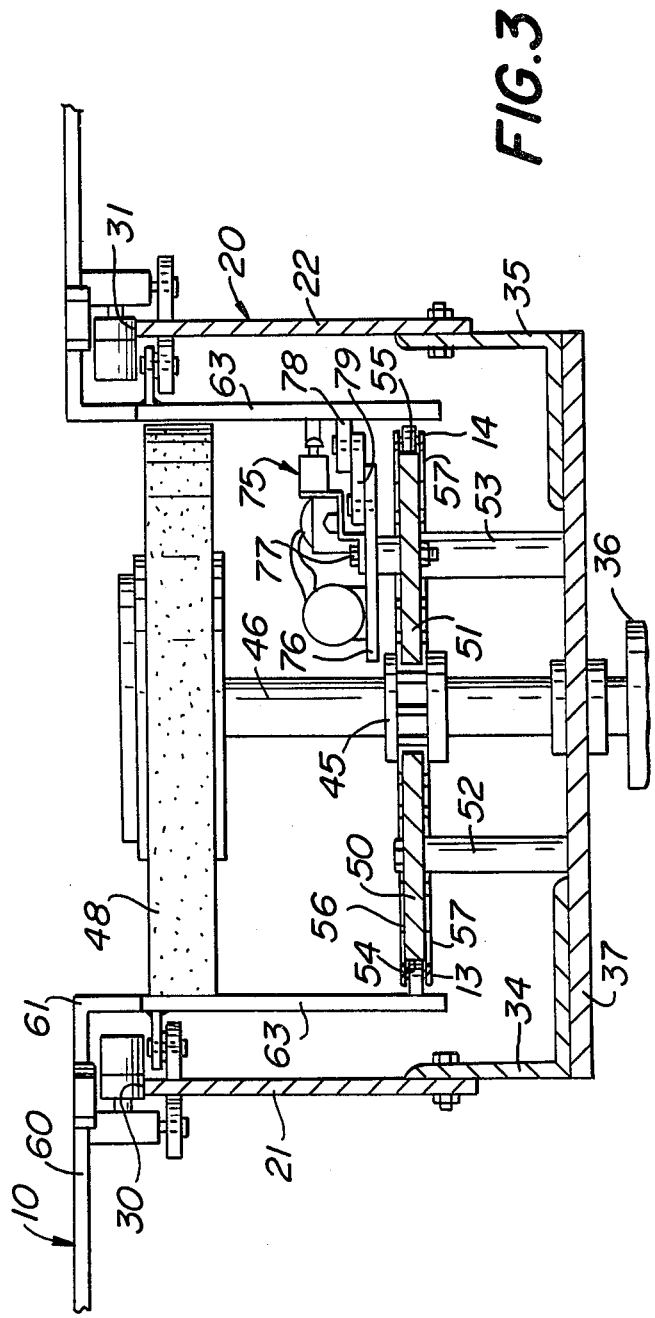
FIG. 3 is a transverse sectional view taken generally along the line 3—3 of FIG. 2, showing the rightward carrier located at a work station.

In backing relation with each of the roller chain runs 13 and 14, inward of the endless chain configuration, are respective elongate, parallel, generally horizontally disposed fixed backing members or plates 50 and 51, which may be fixedly mounted in position, as by fasteners 52 and 53 secured to the horizontal plate 33, see FIG. 3. It will there be seen that the roller chain run 13 rides along the laterally outer edge 54 of horizontal backing plate 50; and similarly, the roller chain run 14 rides on the laterally outer edge 55 of horizontal backing plate 51. The links 40 of chain 12 may have interposed at spaced locations guide links 56 and 57 which extend inwardly from the chain respectively overlying and underlying the backing plates 50 and 51. The guide links 56 and 57 thus constrain the chain 12 to movement along the outer edges 54 and 55 of the plates 50, 51, and in the plane thereof. In practice, the freely rotatable frictional rollers 42 roll along the edge surfaces 54 and 55 of the backing members 50 and 51.

Figure 4:
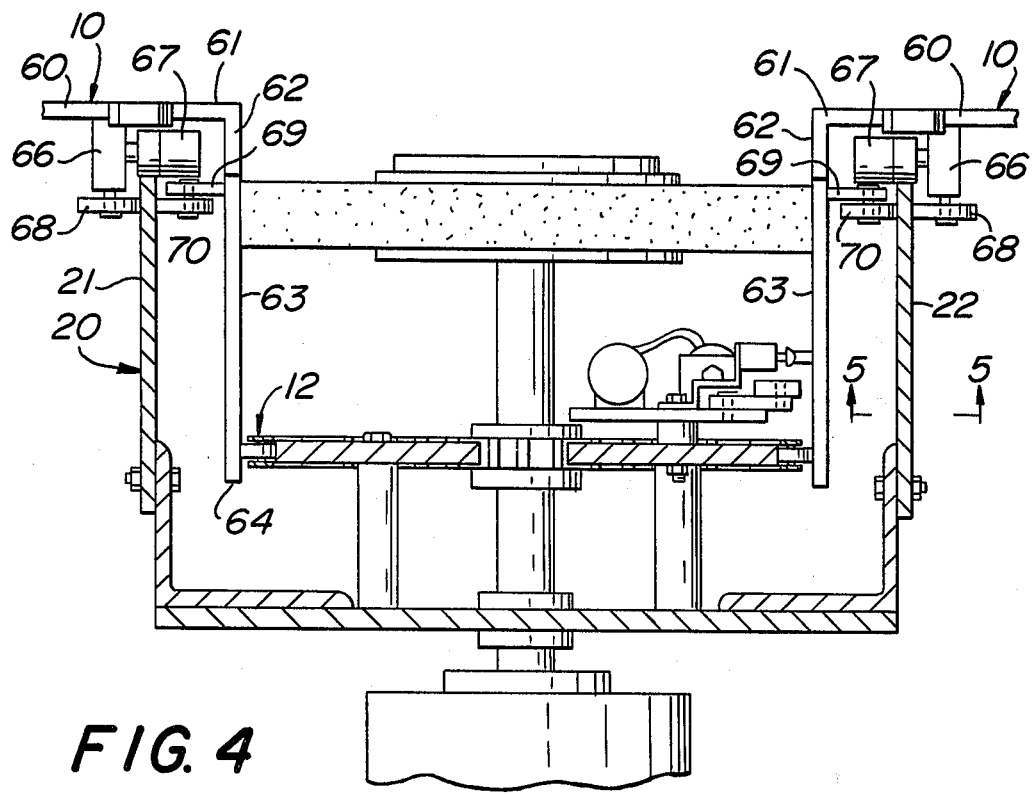
FIG. 4 is a sectional elevational view similar to FIG. 3, but showing the rightward carrier in its transit condition.

Each carrier 10 may include a generally horizontal plate or table part 60 extending from an inner region 61 (see FIGS. 3 & 4) laterally outwardly over and beyond the track 20, as at track run 22. From the inner edge region 61 of each table 60 there depends a generally vertical flange 62, from the lower edge of which depends a rigid extension 63 terminating at its lower end 64 below the level of drive element or chain 12.

Figure 5:
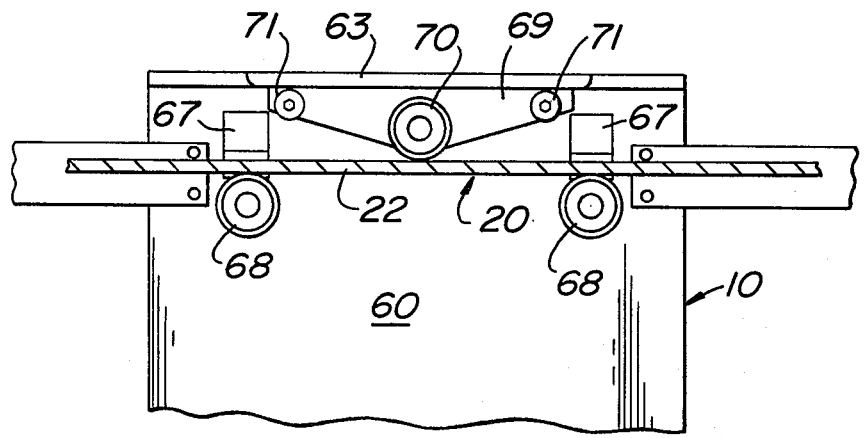
FIG. 5 is a sectional elevational view taken generally along the line 5-5 of FIG. 4.

On the underside of each carrier table 60, adjacent to and spaced outward of the track 20, may be a pair of roller mounts or blocks 66 each carrying a horizontally inwardly extending roller 67 overlying and in rolling engagement with the upper edge surface of the track 20. The rollers 67 are rotatable about their horizontal axis for rolling engagement on the upper edge surfaces of the track 20, and the rollers are of substantial axial dimension for rolling engagement about the arcuate end sections 23 and 24 of the track 20. In addition, depending from each mounting block 66, outward of the adjacent track 20 is a generally horizontal roller 68 rotatable about a vertical axis for rolling engagement with the laterally outer vertical surface of the track 20. A roller mount or bracket 69 may be suitably fixed to the depending extension 63 of each carrier 10, and carries a horizontally disposed roller 70 rotatable about a vertical axis and located for rolling engagement with inner vertical surface of the track 20. Each roller 70 may be located medially between a pair of rollers 68, see FIG. 5. In addition, a pair of auxiliary rollers 71 may be carried by each bracket or mount 69 on opposite sides of the roller 70 and respectively adjacent to roller 68.

With the carriers 10 in position on the track 20, it will be appreciated that the pair of rollers 67 of each carrier rest on and roll upon the upper edge of the track 20, while the rollers 68 and 70 are in guiding engagement with opposite vertical surfaces of the track. As the carrier table or plate 60 extends laterally outwardly, its weight tends to swing the extension 63 laterally inwardly into bearing engagement with the chain 12. Thus, the frictional rollers 42 of the chain 12 are engaged on their laterally inner sides by the backing members 50 and 51, and on their laterally outer sides by the depending extensions or drive element engaging member 63. The rollers 42 are frictionally caused to roll on the backing members 50 and 51, and in turn frictionally drive the engaging member 63 along the path of the chain, and at twice the speed of chain movement, as will be appreciated from the kinematics of the frictional rollers.

As the carriers 10 move along the end regions or turnarounds 23 and 24 of the track 20, the supporting rollers 67 maintain rolling engagement with the upper edge surface of the track by reason of the horizontal elongation of the rollers. Also, freedom to move along the arcuate track end regions is facilitated by the alternately offset relation between the spaced guide rollers 68 on the outer side of the track and the medially located guide roller 70 on the inner side of the track. The outer guide rollers 68 may lose contact with the track, and the innermost pair of guide rollers 71 may insure a limiting guiding rolling engagement with the inner side of the track.

At the end regions of the track 20, the drive element or chain 21 may lose its driving engagement with the carrier extensions 63, as by the absence of frictional roller backing means, or for other reason, and carrier movement may be maintained by the horizontal friction wheels 48 and 49 in frictional driving engagement with the depending carrier extensions 63. This condition is shown on the left hand side in FIGS. 3 and 4. That is, the weight of the carriers 10, and its outboard location, maintains the carrier extensions in frictional engagement with the wheels 47 and 48 for movement thereby about the end regions of the track.

At one or more selected locations along the track 20, there may be provided suitable means for automatically disengaging a carrier extension 63 from its driven relation with the drive element 12, and thereby stopping the carrier at a work station.

One such disengaging or declutching means is shown in FIGS. 1-3, and there generally designated 75. A disengaging or declutching assembly 75 may be fixedly mounted on one of the backing members or plates 51, and may include a horizontal base member or mounting plate 76 suitably fixed in spaced relation above backing member 51, as by fastenter means 77. Directly over the drive element or chain 12, extending longitudinally thereof, is an elongate displacement member or bar 78 mounted to the base member 76 for generally parallel movement by a pair of parallel links 79 and 80. Thus, the displacement bar 78 is swingable in parallelism with and over the chain 12 between a position laterally inward of the chain and a position laterally outward of the chain. In the position laterally outward of the chain 12, the displacement bar 78 will engage with a depending engagement member 63 of a carrier 10 to displace the engagement member laterally outwardly and spaced from the drive element or chain 12. This condition is shown in FIG. 3, on the right hand side.

Actuation of the displacement bar 78 is effected by a piston-and-cylinder assembly 72 having its piston end pivoted, as at 81 to the base 76, and having its rod part 82 suitably connected, as by a connection member 83, to the displacement bar 78. Thus, upon retraction of the piston rod 82 with respect to the cylinder 72, the displacement member or bar is caused to shift outwardly for displacing a carrier extension 63 out of its driven relation with the chain 12. Actuation of the above described disengaging or declutching means 75 may be effected by a limit switch or sensor 84 responsive to engagement by a carrier engaging extension 63 for switching fluid to operate the cylinder 72 through a timed cycle. After the elapse of time sufficient to perform a desired operation at the work station, the piston rod 82 may be extended to remove the displacement bar 78 from engagement with the carrier extension 63. The carrier extension will then by gravity, be frictionally engaged by the drive element or chain 12 to continue its movement along the path of track 20. Of course, as many work stations may be provided as desired.

From the foregoing, it is seen that the present invention provides a multiple station production line conveyor which is extremely simple in construction, inherently durable and reliable throughout a long useful life, extremely versatile in setup for accomodation to a wide variety of production line requirements, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A multi-station conveyor comprising an elongate endless drive element extending along a path having straight sections and turns connecting said straight sections, motive means effecting longitudinal movement of said drive element along said path, a track extending longitudinally along said drive element and having an upwardly facing bearing surface outwardly of an above said drive element, a carrier mounted on said track for movement therealong, drive element engaging means depending rigidly from said carrier between said track and drive element and normally urged inwardly into driven engagement with said drive element, declutching means inwardly of said track including a deflector for deflecting said engaging means outwardly out of engagement with said drive element for stopping said carrier, and a generally horizontal friction wheel mounted for rotation about a fixed axis centrally of each of said turns for bearing engagement with the inner side of said carrier extension passing along said turns.

2. A multi-station conveyor according to claim 1, said carrier extension being generally flat and tangent to said path along said turns, and said friction wheels each having a radius approximately equal to the radius of said path and said turns for maximum bearing engagement with said carrier extensions.

* * * * *